US011346755B2

(12) United States Patent
Kimmerling et al.

(10) Patent No.: US 11,346,755 B2
(45) Date of Patent: May 31, 2022

(54) CALIBRATION OF A FUNCTIONAL BIOMARKER INSTRUMENT (71) Applicant: Travera LLC, Cambridge, MA (US)

(72) Inventors: Rob Kimmerling, Cambridge, MA (US); Anthony Minnah, Weymouth, MA (US); Selim Olcum, Cambridge, MA (US); Mark Stevens, Cambridge, MA (US); Madeleine Vacha, Watertown, MA (US)

(73) Assignee: Travera, Inc., Medford, MA (US)

(*) Notice: Subject to any disclaimer, the term of this patent is extended or adjusted under 35 U.S.C. 154(b) by 327 days.

(21) Appl. No.: 16/739,756

(22) Filed: Jan. 10, 2020

(65) Prior Publication Data

US 2020/0225127 A1 Jul. 16, 2020

Related U.S. Application Data (60) Provisional application No. 62/790,809, filed on Jan. 10, 2019.

(51) Int. Cl.
*G01N 1/28* (2006.01)
*B01L 3/00* (2006.01)

(52) U.S. Cl.
CPC .......... *G01N 1/28* (2013.01); *B01L 3/502761* (2013.01); *B01L 2200/148* (2013.01); *B01L 2300/0663* (2013.01); *G01N 2001/2893* (2013.01)

(58) Field of Classification Search
CPC .............. G01N 1/28; G01N 2001/2893; B01L 3/502761; B01L 2300/0663; B01L 2200/148
See application file for complete search history.

(56) References Cited

U.S. PATENT DOCUMENTS

| | | | |
|---|---|---|---|
| 1,007,028 A | 10/1911 | Gilbert | |
| 4,683,195 A | 7/1987 | Mullis et al. | |
| 4,683,202 A | 7/1987 | Mullis | |
| 6,210,891 B1 | 4/2001 | Nyren et al. | |
| 6,223,128 B1 | 4/2001 | Allex et al. | |
| 6,235,501 B1 | 5/2001 | Gautsch et al. | |
| 6,306,597 B1 | 10/2001 | Macevicz | |
| 6,719,449 B1 | 4/2004 | Laugharn, Jr. et al. | |
| 6,828,100 B1 | 12/2004 | Ronaghi | |
| 6,833,246 B2 | 12/2004 | Balasubramanian | |
| 6,911,345 B2 | 6/2005 | Quake et al. | |
| 6,948,843 B2 | 9/2005 | Laugharn, Jr. et al. | |
| 7,215,214 B1 | 5/2007 | Taheri et al. | |
| 7,232,656 B2 | 6/2007 | Balasubramanian et al. | |
| 7,387,889 B2 | 6/2008 | Manalis | |
| 7,449,968 B1 | 11/2008 | Cioffi et al. | |
| 7,598,035 B2 | 10/2009 | Macevicz | |
| 7,640,051 B2 | 12/2009 | Krishnan et al. | |
| 7,809,509 B2 | 10/2010 | Milosavljevic | |
| 7,812,680 B1 | 10/2010 | Brown et al. | |
| 7,835,871 B2 | 11/2010 | Kain et al. | |
| 7,838,284 B2 | 11/2010 | Manalis | |
| 7,960,120 B2 | 6/2011 | Rigatti et al. | |
| 8,087,284 B2 | 1/2012 | Babcock et al. | |
| 8,165,821 B2 | 4/2012 | Zhang | |
| 8,209,130 B1 | 6/2012 | Kennedy et al. | |
| 8,291,750 B1 | 10/2012 | Goodbread et al. | |
| 8,418,535 B2 | 4/2013 | Manalis et al. | |
| 8,639,043 B2 | 1/2014 | Levenson et al. | |
| 8,722,419 B2 | 5/2014 | Manalis et al. | |
| 8,929,849 B1 | 1/2015 | Dudziak | |
| 9,027,388 B2 | 5/2015 | Babcock et al. | |
| 9,132,294 B2 | 9/2015 | Zheng et al. | |
| 9,134,294 B2 | 9/2015 | Manalis et al. | |
| 9,134,295 B1 | 9/2015 | Delgado et al. | |
| 9,347,815 B2 | 5/2016 | Roukes et al. | |
| 9,515,608 B2 | 12/2016 | Gourlat et al. | |
| 9,558,399 B1 | 1/2017 | Jeka et al. | |
| 9,709,400 B2 | 7/2017 | Kapusta | |
| 9,757,727 B2 | 9/2017 | Manalis et al. | |
| 2003/0033876 A1 | 2/2003 | Roukes et al. | |
| 2003/0062473 A1 | 4/2003 | Weinberger et al. | |
| 2003/0176174 A1 | 9/2003 | Seppinen et al. | |
| 2005/0064581 A1 | 3/2005 | Manalis et al. | |
| 2005/0112590 A1 | 5/2005 | Boom et al. | |
| 2005/0164236 A1 | 7/2005 | Su et al. | |
| 2005/0186969 A1 | 8/2005 | Lohtia | |
| 2006/0024681 A1 | 2/2006 | Smith et al. | |
| 2006/0292611 A1 | 12/2006 | Berka et al. | |

(Continued)

FOREIGN PATENT DOCUMENTS

FR 2996219 A1 4/2014
JP 2007-506977 A 3/2007

(Continued)

OTHER PUBLICATIONS

Grover, 2011, Measuring single-cell density, Proc Natl Acad Sci U S A, 108(27):10992-6.
Guillou, 2016, Dynamic monitoring of cell mechanical properties using profile microindentation, Sci Rep, 6:21529(1-13).
Guo, 2017, Cell volume change through water efflux impacts cell stiffness and stem cell fate, Proc Natl Acad Sci U S A, 114(41):E8618-E8627.
Gupta, 2017, Equilibrium and out-of-equilibrium mechanics of living mammalian cytoplasm, J Meehan Phys Solids, 107:284-93.
Hanay, 2012, Single-protein nanomechanical mass spectrometry in real time, Nat Nanotechnol, 7(9):602-8.

(Continued)

*Primary Examiner* — Christopher Adam Hixson
(74) *Attorney, Agent, or Firm* — Brown Rudnick LLP; Thomas C. Meyers (57) ABSTRACT Methods of calibration are provided. A method comprises introducing a material with cell-like properties and a known mass into a sensor on a measurement instrument to generate a calibration reading and adjusting an output module of the measurement instrument until the measurement instrument calibrates to the known mass for the material.

33 Claims, 6 Drawing Sheets

(56) References Cited

U.S. PATENT DOCUMENTS

| | | |
|---|---|---|
| 2007/0114362 A1 | 5/2007 | Feng et al. |
| 2007/0176705 A1 | 8/2007 | Sutardja |
| 2007/0178529 A1 | 8/2007 | Breidford et al. |
| 2009/0014360 A1 | 1/2009 | Toner et al. |
| 2009/0044608 A1 | 2/2009 | Babcock et al. |
| 2009/0053749 A1 | 2/2009 | Manalis et al. |
| 2009/0261241 A1 | 10/2009 | Roukes et al. |
| 2009/0318310 A1 | 12/2009 | Liu et al. |
| 2010/0075628 A1 | 3/2010 | Ye |
| 2010/0154535 A1 | 6/2010 | Manalis et al. |
| 2010/0227310 A1 | 9/2010 | Manalis et al. |
| 2010/0263445 A1 | 10/2010 | Hayner et al. |
| 2010/0315138 A1 | 12/2010 | Namba et al. |
| 2011/0009278 A1 | 1/2011 | Kain et al. |
| 2011/0113856 A1 | 5/2011 | Cobianu et al. |
| 2011/0218839 A1 | 9/2011 | Shamaiengar |
| 2011/0257889 A1 | 10/2011 | Klammer et al. |
| 2011/0271412 A1 | 11/2011 | Rychen |
| 2012/0013475 A1 | 1/2012 | Farley et al. |
| 2013/0132438 A1 | 5/2013 | Park et al. |
| 2013/0210647 A1 | 8/2013 | Kassis |
| 2013/0244686 A1 | 9/2013 | Saha et al. |
| 2013/0268474 A1 | 10/2013 | Nizzari et al. |
| 2013/0304894 A1 | 11/2013 | Kim |
| 2014/0013848 A1 | 1/2014 | Colinet et al. |
| 2014/0156224 A1 | 6/2014 | Roukes et al. |
| 2014/0236759 A1 | 8/2014 | Mirabile |
| 2014/0306623 A1 | 10/2014 | Caffee et al. |
| 2014/0312980 A1 | 10/2014 | Villard et al. |
| 2015/0032264 A1 | 1/2015 | Emmons et al. |
| 2015/0067351 A1 | 3/2015 | Wang et al. |
| 2015/0300999 A1 | 10/2015 | Andreucci et al. |
| 2015/0308990 A1 | 10/2015 | Andreucci et al. |
| 2015/0343444 A1 | 12/2015 | Manalis et al. |
| 2016/0044467 A1 | 2/2016 | Clausen |
| 2016/0091544 A1 | 3/2016 | Daneshmand et al. |
| 2016/0123858 A1 | 5/2016 | Kapur et al. |
| 2016/0174032 A1 | 6/2016 | Xin et al. |
| 2016/0174902 A1 | 6/2016 | Georgescu et al. |
| 2016/0181977 A1 | 6/2016 | Gourlat et al. |
| 2016/0210647 A1 | 7/2016 | Chang et al. |
| 2017/0053398 A1 | 2/2017 | Mahoor et al. |
| 2017/0117905 A1 | 4/2017 | Cermak et al. |
| 2017/0176478 A1 | 6/2017 | Harbers et al. |
| 2018/0207639 A1 | 7/2018 | Butler et al. |
| 2018/0299362 A1 | 10/2018 | Kimmerling et al. |

FOREIGN PATENT DOCUMENTS

| | | |
|---|---|---|
| JP | 2013-543127 A | 11/2013 |
| JP | 2014-006211 A | 1/2014 |
| JP | 2014-510921 A | 5/2014 |
| WO | 2012/059828 A2 | 5/2012 |
| WO | 2012172204 A1 | 12/2012 |
| WO | 2015/155044 A1 | 10/2015 |
| WO | 2016069634 A1 | 5/2016 |
| WO | 2016/094330 A2 | 6/2016 |
| WO | 2016/182551 A1 | 11/2016 |
| WO | 2018/236708 A1 | 12/2018 |

OTHER PUBLICATIONS

Hartono, 2011, On-chip measurements of cell compressibility via acoustic radiation, Lab Chip, 11(23):4072-80.

Henderson, 1992, Actin filament dynamics in living glial cells imaged by atomic force microscopy, Science, 257(5078):1944-6.

Hiramoto, 1974, Mechanical properties of the surface of the sea urchin egg at fertilization and during cleavage. Exp Cell Res, 89(2):320-6.

Hogenauer, 1981, An economical class of digital filters for decimation and interpolation, IEEE Trans on Acousitics, Speech, and Signal Processing, 29(2):155-62.

International Preliminary Report on Patentability issued in International Application No. PCT/US2015/057634, dated Jan. 22, 2016 (6 pages).

International Preliminary Report on Patentability issued in International Application No. PCT/US2018/0258040, dated Oct. 10, 2019 (7 pages).

International Preliminary Report on Patentability issued in International Application No. PCT/US2018/037995, dated Jan. 2, 2020 (8 pages).

International Search Report and Written Opinion issued in International Application No. PCT/US2015/057634, dated Jan. 22, 2016 (10 pages).

International Search Report and Written Opinion issued in International Application No. PCT/US2018/025040, dated Jun. 8, 2018 (12 pages).

International Search Report and Written Opinion issued in International Application No. PCT/US2018/037995, dated Aug. 27, 2018 (12 pages).

International Search Report and Written Opinion issued in International Application No. PCT/US2020/013089, dated Apr. 8, 2020 (7 pages).

International Search Report and Written Opinion issued in International Application No. PCT/US2020/13096, dated Apr. 9, 2020 (14 pages).

Ivanova, 2013, Bactericidal activity of black silicon. Nat Commun, 4:2838(1-7).

Jin, 2015, A microfluidic device enabling high-efficiency single cell trapping, Biomicrofluidics, 9:014101(1-16).

Khalili, 2016, A microfluidic device for hydrodynamic trapping and manipulation platform of a single biological cell, Appl Sci, 6(40):1-17.

Kimmerling, 2016, A microfluidic platform enabling single-cell RNA-seq of multigenerational lineages, Nat Commun, 7:10220(1-7).

Kimmerling, 2017, A toolset for linking phenotype and gene expression at the single-cell level. Doctoral Thesis-Massachusetts Institute of Technology, (142 pages).

Knudsen, 2016, Water and small-molecule permeation of dormant Bacillus subtilis spores, J Bacterial, 98(1):168-77.

Kobayashi, 2009, Frequency noise in freuency modulation atomic force microscopy, Rev Sci Instrum, 80(4):043708(1-8).

Kouh, 2005, Room-temperature operation of a nanoelectromechanical resonator embedded in a phase-locked loop, Appl Phys Lett, 87(11):113112(1-3).

Kumar, 2010, Comparing de novo assemblers for 454 transcriptome data, Genomics 11:571 (12 pages).

Kundu, 1991, Measuring elastic properties of cells by evaluation of scanning acoustic microscopy V(Z) values using simplex algorithm, Biophys J. 59(6):1194-207.

Lee, 2010, Toward attogram mass measurements in solution with suspended nanochannel resonators, Nano Lett, 10(7):257-42.

Li, 2009, Fast and accurate short read alignment with Burrows-Wheeler Transform, Bioinformatics 25:1754-1760.

Li, 2009, The Sequence alignment/map (SAM) format and SAMtools, Bioinformatics 25:2078-2079.

Li, 2011, Improving SNP discovery by base alignment quality, Bioinformatics 27,1157-1158.

Lim, 2006, Mechanical models for living cells—a review, J Biomech, 39(2):195-216.

Lin, 2008, ZOOM! Zillions Of Oligos Mapped, Bioinformatics 24:2431-2437.

Lincoln, 2007, High-throughput rheological measurements with an optical stretcher, Methods Cell Biol, 83:397-423.

Manak, 2018, Live-cell phenotypic-biomarker microfluidic assay for the risk stratification of cancer patients via machine learning, Nat Biomed Eng, 2(10): entire document esp. p. 1, p. 3, p. 6, p. 8, p. 17.

Matzke, 2001, Direct, high-resolution measurement of furrow stiffening during division of adherent cells, Nat Cell Biol, 3(6):607-10.

McKenna, 2010, The Genome Analysis Toolkit: a MapReduce framework for analyzing next-generation DNA sequencing data, Genome Res, 20(9):1297-1303.

(56) References Cited

OTHER PUBLICATIONS

Narang, 1977, Improved Phosphotriester Method for the Synthesis of Gene Fragments, Methods Enzymol, 68:90-98.
Narayanamurthy, 2017, Microfluidic hydrodynamic trapping for single cell analysis: mechanisms, methods and applications, Anal Methods, 9:3751-72.
Ning, 2001, SSAHA: A fast search method for large DNA database, Genome Research, 11(10):1725-9.
Olcum, 2014, Weighing nanoparticles in solution at the attogram scale, Proc Natl Acad Sci USA, 111(4):1310-5.
Olcum, 2015, High-speed multiple-mode mass-sensing resolves dynamic nanoscale mass distributions, Nat Commun, 6:7070(1-8).
Otto, 2015, Real-time deformability cytometry: on-the-fly cell mechanical phenotyping, Nat Methods, 12(3):199-202.
Ou-Yang, 2010, Complex fluids: Probing mechanical properties of biological systems with optical tweezers, Annu Rev Phys Chem, 61:421-40.
Paluch, 2009, Biology and physics of cell shape changes in development, Curr Biol, 19(17):R790-9.
Plomp, 2014, Architecture and assembly of the Bacillus subtilis spore coat, PLoS One, 9(9):e108560(1-16).
Press, 2007, Section 16.5, Support Vector Machines, Numerical Recipes: The Art of Scientific Computing (3rd Ed.), New York: Cambridge University (1262 pages).
Pritchard, 2004, The role of F-actin in hypo-osmotically induced cell volume change and calcium signaling in anulus fibrosus cells, Ann Bio med Eng, 32(1):103-11.
Radmacher, 2007, Studying the mechanics of cellular processes by atomic force microscopy, Methods Cell Biol, 83:347-72.
Ramanathan, 2015, Cdk1-dependent mitotic enrichment of cortical myosin II promotes cell rounding against confinement, Nat Cell Biol, 17(2):148-59.
Riedel, 2008, Lifeact: a versatile marker to visualize F-actin, Nat Methods, 5(7):605-7.
Rinke, 2014, Obtaining genomes from uncultivated environmental microorganisms using FACSbased single-cell genomics, Nat Protoc, 9(5):1038-48.
Rodrigues, 2015, Kinetochore-localized PP1-Sds22 couples chromosome segregation to polar relaxation, Nature, 524(7566):489-92, Suppl Info (18 pages).
Sader, 2010, Energy dissipation in microfluidic beam resonators: Dependence on mode number, J Appl Phys, 108(11):114507(1-14).
Sader, 2011, Energy dissipation in microfluidic beam resonators: Effect of Poisson's ratio, Phys Rev E Stat Nonlin Soft Matter Phys, 84(2 Pt 2):026304(1-15).
Scherrer, 1971, Macromolecular sieving by the dormant spore of Bacillus cereus, J Bacteriol, 108(2):868-73.
Scherrer, 1974, Porosity of the yeast cell wall and membrane, J Bacteriol, 118(2):534-40.
Scherrer, 1977, Density, porosity, and structure of dried cell walls isolated from Bacillus megaterium and *Saccharomyces cerevisiae*, J Bacteriol, 129(2):1162-4.
Sell, 2011, A digital PLL circuit for resonator sensors, Sensors and Actuators A, 172(1):69-74.
Simonyan, 2014, Very deep convolutional networks for large-scale image recognition, CoRR, abs/3409.1556, (14 pages).
Simpson, 2009, ABySS: A parallel assembler for short read sequence data, Genome Res., 19(6):1117-23.
Solla, 2000, Advances in Neural Information Processing Systems 12, MIT Press, pp. 512-518.
Son, 2012, Direct observation of mammalian cell growth and size regulation, Nat Methods, 9(9):910-2.
Son, 2015, Resonant microchannel volume and mass measurements show that suspended cells swell during mitosis, J Cell Biol, 211(4):757-63.
Steltenkamp, 2006, Membrane stiffness of animal cells challenged by osmotic stress, Small, 2(8-9):1016-20.
Stevens, 2016, Drug sensitivity of single cancer cells is predicted by changes in mass accumulation rate, Nat Biotechnol, 34(11):1161-1167.
Stewart, 2011, Hydrostatic pressure and the actomyosin cortex drive mitotic cell rounding, Nature, 469(7329):226-30, Supplementary Information (19 pages).
Swaminathan, 2011, Mechanical stiffness grades metastatic potential in patient tumor cells and in cancer cell lines, Cancer Res, 71(15):5075-80.
Szegedy, 2015, Going deeper with convolutions, in CVPR (12 pages).
Tseng, 2002, Micromechanical mapping of live cells by multiple-particle-tracking microrheology, Biophys J, 83(6):3162-76.
Wang, 1993, Mechanotransduction across the cell surface and through the cytoskeleton, Science, 260(5111):1124-7.
Wang, 2013, Acoustophoretic force-based compressibility measurement of cancer cells having different metastatic potential. Proc Mtgs Acoust, 19:045019(1-5).
Wang, 2015, Face Search at Scale: 80 Million Gallery, MSU Technical Report MSU-SCE-15-11 (14 pages).
Wang, 2016, Fast stiffness mapping of cells using high-bandwidth atomic force microscopy, ACS Nano, 10(1):257-64.
Warren, 2007, Assembling millions of short DNA sequences using SSAKE, Bioinformatics, 23:500-501.
Yang, 2016, A comprehensive strategy for the analysis of acoustic compressibility and optical de formability on single cells, Sci Rep, 6:23946(1-11).
Yeung, 1989, Cortical shell-liquid core model for passive flow of liquid-like spherical cells into micropipets, Biophys J, 56(1):139-49.
Zerbino, 2008, Velvet: Algorithms for de novo short read assembly using de Bruijn graphs, Genome Research 18(5):821-829.
Zlotek-Zlotkiewicz, 2015, Optical volume and mass measurements show that mammalian cells swell during mitosis, J Cell Biol, 211(4):765-74.
Albrecht, 1991, Frequency modulation detection using high-Q cantilevers for enhanced force microscope snesitivity, J Appl Phys, 69(2):668-73.
AlexNet Krizhevsky, 2012, Imagenet classification with deep convolutional neural networks, in Pereira, et al., Eds. Advances in Neural Information Processing Systems 25, 9 pages.
Ananthakrishnan, 2006, Quantifying the contribution of actin networks to the elastic strength of fibroblasts, J Theor Biol, 242(2):502-16.
Antonarakis, 1998, Recommendations for a nomenclature system for human gene mutations, Human Mutations 11:1-3.
Atia, 1997, A phase-locked shear-force microscope for distance regulation in near-field optical microscopy, App Phys Lett, 70(4):405-7.
Bagnall, 2016, Deformability-based cell selection with downstream immunofluorescence analysis, Integr Biol (Camb), 8(5):654-64.
Balland, 2006, Power laws in microrheology experiments on living cells: Comparative analysis and modeling, Phys Rev E Stat Nonlin Soft Matter Phys, 74(2 Pt1):021911(1-17).
Ben-Hur, 2001, Support Vector Clustering, Journal of Machine Learning Research, 2:125-137.
Bouloc, 2011, FPGA-based prgrammable digital PLL with very high frequency resolution, 2011 18th IEEE Intl Conf on Electronics, Circuits, and Systems, 370-3.
Bouloc, 2012, All digital control system for a novel high frequency force sensor in non contact atomic force microscopy, IEEE Sensors, 1-4.
Brangwynne, 2007, Force fluctuations and polymerization dynamics of intracellular microtubules, Proc Natl Acad Sci U S A, 104(41):16128-33.
Breiman, 2001, Random Forests, Machine Learning 45:5-32.
Bremer, 2008, Modulation of chemical composition and other parameters of the cell at different exponential growth rates, EcoSal Plus, 3(1):1-49.
Brown, 1979, Chemical synthesis and cloning of a tyrosine tRNA gene, Methods Enzymol, 68:109-51.
Bruus, 2011, Acoustofluidics 1: Governing equations in microfluidics, Lab Chip, 11(22):3742-51.
Bryan, 2010, Measurement of mass, density, and volume during the cell cycle of yeast, Proc Natl Acad Sci U S A, 107(3):999-1004.

(56) References Cited

OTHER PUBLICATIONS

Bryan, 2014, Measuring single cell mass, volume and density with dual suspended microchannel resonators, Lab Chip, 14(3):569-576.
Burg, 2009, Nonmonotonic energy dissipation in microfluidic resonators, Phys Rev Lett, 102(22):228103(1-4).
Butzin, 2012, Analysis of the effects of a gerP mutation on the germination of spores of Bacillus subtilis, J Bacterial, 194(21):5749-58.
Byun, 2013, Characterizing deformability and surface friction of cancer cells, Proc Natl Acad Sci U S A, 110(19):7580-5.
Byun, 2015, Characterizing cellular biophysical responses to stress by relating density, deformability, and size, Biophys J, 109(8):1565-73.
Cartagena-Rivera, 2016, Actomyosin cortical mechanical properties in nonadherent cells determined by atomic force microscopy, Biophys J, 110(11):2528-2539.
Cermak, 2017, Direct single-cell biomass estimates for marine bacteria via Archimedes' principle, ISME J, 1(3):825-828.
Chaste, 2012, A nanomechanical mass sensor with yoctogram resolution, Nat Nanotechnol, 7(5):301-4.
Chen, 2016, XGBoost: A Scalable Tree Boosting System, 22nd SIGKDD Conference on Knowledge Discovery and Data Mining, pp. 785-794.
Chugh, 2017, Actin cortex architecture regulates cell surface tension, Nat Cell Biol, 19(6):689-697 (Suppl Info 19 pages).
Clark, 2013, Monitoring actin cortex thickness in live cells, Biophys J, 105(3):570-80.
Criminisi, 2012, Decision Forests: A Unified Framework for Classification, Regression, Density Estimation, Manifold Learning and Semi-Supervised Learning, Foundations and Trends in Computer Graphics and Vision 7(2-3):81-227.
Cunningham, 2010, Tissue disaggregation, Methods Mol Biol, 588:327-330.
Danecek, 2011, The variant call format and VCFtools, Bioinformatics 27(15):2156-2158.
De Dunnen, 2003, Mutation Nomenclature, Curr Prot Hum Genet, 109:121-124.
Delgado, 2013, Intracellular water exchange for measuring the dry mass, water mass and changes in chemical composition of living cells, PLoS One, 8(7):e67590(1-11).
Dendukuri, 2006, Continuous-flow lithography for high-throughput microparticle synthesis, Nat Mater, 5(5):365-9.
Dendukuri, 2007, Stop-flow lithography in a microfluidic device, Lab Chip, 7(7):818-28.
Dextras, 2009, Integrated measurement of the mass and surface charge of discrete microparticles using a suspended microchannel resonator, Anal Chem, 81:4517-23.
Di Carlo, 2007, Continuous inertial focusing, ordering, and separation of particles in microchannels, Proc Natl Acad Sci, 104(48):18892-7.
Dieffenbach, 1995, PCR Primer, a Laboratory Manual, Cold Spring Harbor Press, Plainview, NY.
DiGuistini, 2009, De novo sequence assembly of a filamentous fungus using Sanger, 454 and Illumina sequence data, Genome Biology, 10:R94 (12 pages).
Dohn, 2010, Position and mass determination of multiple particles using cantilever based mass sensors, Appl Phys Lett, 97(4):044103 (4 pages).
Ekinci, 2004, Ultimate limits to inertial mass sensing based upon nanoelectromechanical systems, J Appl Phys, 95(5):2682-9.
Fischer-Friedrich, 2016, Rheology of the active cell cortex in mitosis, Biophys J, 111(3):589-600.
Freund, 1997, A decision-theoretic generalization of on-line learning and an application to boosting, Journal of Computer and System Sciences, 55:119-139.
Gardel, 2010, Mechanical integration of actin and adhesion dynamics in cell migration, Annu Rev Cell Dev Biol, 26:315-33.
Gavartin, 2013, Stabilizaton of a linear nanomechanical oscillator to its thermodynamic limit, Nat Commun, 4:2860(1-8).
Georgatos, 1997, Nuclear envelope breakdown in mammalian cells involves stepwise lamina disassembly and microtubule-drive deformation of the nuclear membrane, J Cell Sci, 110( Pt 17):2129-40.
Gerhardt, 1961, Permeability of bacterial spores. II. Molecular variables affecting solute permeation, J Bacterial, 82:750-60.
Godin, 2010, Using buoyant mass to measure the growth of single cells, Nat Methods, 7(5):387-90, total of (9 pages).
Goldstein, 2014, Faculty profile: Scott Manalis, MIT BE Newsletter (3 pages).
Gossett, 2012, Hydrodynamic stretching of single cells for large population mechanical phenotyping, Proc Natl Acad Sci U S A, 15;109(20):7630-5.
Green, 2012, Molecular Cloning: A Laboratory Manual 4th edition, Cold Spring Harbor Laboratory Press, Cold Spring Harbor, NY, (2028 pages).
Burg, 2007, Weighing of biomolecules, single cells and single nanoparticles in fluid, Nature 446:1066-1069.
Calistri, 2018, Microfluidic active loading of single cells enables analysis of complex clinical specimens, Nat Com, 39 pages.
Cermak, 2016, High-throughput measurement of single-cell growth rates using serial microfluidic mass sensor arrays, Nat Biotech 34(10):1052-1059.
Cetin, 2017, Determining therapeutic susceptibility in multiple myeloma by single-cell mass accumulation, Nat Com 8:1-12.
Dohn, 2007, Mass and position determination of attached particles on cantilever based mass sensors, Rev. Sci. Instrum. 78(103303):1-4.
Friedman, 2015, Precision medicine for cancer with next-generation functional diagnostics, Nat Rev Cancer 15(12):747-756.
Kang, 2019, Noninvasive monitoring of single-cell mechanics by acoustic scattering, Nat Methods, 12 pages.
Kimmerling, 2018, Linking single-cell measurements of mass, growth rate, and gene expression, bioRxiv, 19 pages.
Lee, 2011, High precision particle mass sensing using microchannel resonators in the second vibration mode, Rev. Sci. Instrum. 82(023704):1-4.
Lee, 2011, Suspended microchannel resonators with piezoresistive sensors, Lab Chip 11:645-651.
Luskin, 2018, Targeting minimal residual disease: a path to cure?, Nat Rev Cancer 18:255-263.
Miyoshi, 2015, Etiology of Ascites and Pleural Effusion Associated with Ovarian Tumors: Literature Review and Case Reports of Three Ovarian Tumors Presenting with Massive Ascites, but without Peritoneal Dissemination, Case Reports in Obstetrics and Gynecology, Article ID 414019, 5 pages.
Tang, 2017, High-throughput screening of rare metabolically active tumor cells in pleural effusion and peripheral blood of lung cancer patients, PNAS 114(14):2544-2549.

CALIBRATION OF A FUNCTIONAL BIOMARKER INSTRUMENT

CROSS-REFERENCE TO RELATED APPLICATIONS

This application claims the benefit of, and priority to, U.S. Provisional Patent Application No. 62/790,809, filed Jan. 10, 2019, the contents of which are incorporated by reference.

TECHNICAL FIELD

This invention relates generally to methods of calibrating an instrument, particularly calibration of a functional biomarker instrument.

BACKGROUND

Precision medicine is an approach to medicine that involves the customization of healthcare. Medical tests, decisions, and treatments are tailored to the individual patient. In this approach, diagnostic testing is used to select therapies based on an individual patient's genetic content or other molecular or cellular analysis.

Precision medicine refers to the tailoring of medical treatment to the individual characteristics of each patient and includes the ability to classify individuals into subpopulations based on susceptibility to a particular disease or treatment. Precision medicine often involves genomic analysis of a patient and treatment selection based on genetic markers. Therapeutic intervention is provided to patients who will benefit, sparing expense and side effects to those patients unlikely to benefit. The treatment response for the patient is then tracked, often using surrogate measures such as tumor load. Treatment is finely adapted to the tracked response.

Next-generation sequencing (NGS) technologies make up most of precision medicine. Clinicians use NGS technologies to screen for cancer-associated mutations or to study gene expression levels. Approaches of precision medicine are largely limited to the genomics paradigm. For example, precision oncology is essentially the use of nucleic acid sequencing to find genetic patterns related to cancer.

SUMMARY

The invention provides methods of calibrating instruments that measure functional properties of cells using reference materials with cell-like properties. The functional properties of individual living cells represent a valuable type of information to precision medicine. A patient's disease state or likely drug response may be observed by measuring how isolated living cells grow, divide, or atrophy either on their own or when exposed to drug treatments. Instruments that measure functional properties such as growth, stagnation, or atrophy of living cells are valuable to precision medicine and precision oncology. The invention provides tools and methods for calibrating such instruments using a reference material with properties similar to living cells. Because the reference material has cell-like properties, instruments that measure properties of living cells are calibrated to a standard, or "control", and measurements are reported with accuracy and precision.

The invention recognizes relationships between functional properties of cells, such as relationships between mass and density or deformability. Specifically, instruments that make very fine measurements of mass or mass change of a cell are influenced to some degree when the cell changes density or shape within a typically aqueous medium within a measurement chamber. Measurements of a living cell obtained from an instrument are reliably accurate and precise when the instrument is calibrated using a reference material with a cell-like density or deformability and a known or constant mass.

By using a defined calibration protocol based on a constant or predictable reference material with cell-like properties, different instruments may be calibrated and measurements from the different instruments can be meaningfully compared or used together. The different instruments can all be of the same model and the calibration protocol may ensure the instruments are functioning to specification and providing comparable readings. Significantly, instruments with fundamentally unlike measurement technologies can be calibrated using methods of the disclosure in order to usefully compare measurements from those different instruments.

A preferred embodiment of the invention involves calibrating instruments that measure the mass or mass change of individual living cells. Certain cell mass measurement instruments use a device with a microchannel that extends through a suspended cantilever. The cantilever is mechanically energized by a resonator. The cantilever resonates at a frequency that depends on its mass and, thus, a mass of fluid within the channel. The resonant frequency is measured while media is flowed through the channel. The measured frequency is correlated to a mass of an item in the channel such as a cell. The measurement device is a suspended microchannel resonator (SMR), and the invention provides methods of calibrating the SMR. To calibrate the SMR, media is flowed through the channel. A reference material, such as a hydrogel, that has a deformability and density and mimics properties found in living cells is also flowed through the channel. In a preferred embodiment, the reference hydrogel also has a known mass. Other embodiments for measuring relative masses only require that the reference material remain constant across calibration events and do not require that the mass of the reference material be known. While operating the SMR device, the output reading is adjusted until it corresponds to the known mass of the reference material. Performing calibration across several SMR-based instruments allows measurements from those instruments to be compared to one another.

The invention provides methods and materials for calibrating cellular functional measurement instruments using reference materials that themselves have cell-like properties. For example, a cell deforms when flowed through a channel. The cell displaces aqueous media according to a non-spherical shape that changes with resonance and an instantaneous location of portions of the cell with respect to nodes and antinodes of a wave of the cantilever's resonance. Therefore, calibration with a rigidly spherical reference material such as a plastic bead does not provide the instrument with reliable precision and accuracy when reading mass or mass changes of individual live cells. A reliably precise and accurate measurement of mass or mass change is provided when a reference material with cell-like deformability or elasticity that mimics the mass distribution of the cell and effects (e.g., damping or amplification) that the cell has on resonance is used for calibration. In some examples, the reference material is a hydrogel slug. Instruments calibrated according to the invention add a valuable axis of measurement to precision medicine and oncology. Cells from patient samples are flowed into an instrument, and mass changes measured in the cells can reveal if the cells are growing, stationary, or atrophying. Such features of cellular life may be hallmarks of health, cancer, or drug response, and thus methods and devices of the disclosure are valuable tools for precision medicine.

Methods according to the invention are used to calibrate any suitable instrument that measures functional properties of living cells. One example of a functional biomarker measurement instrument is a suspended microchannel resonator (SMR) or serial SMR (sSMR). The SMR is used to precisely measure biophysical properties, such as mass and mass changes, of a single cell flowing therethrough. In some examples, the mass change is mass accumulation rate (MAR). When used with cancer cells, the changes provide a functional, universal biomarker by which medical professionals (e.g., oncologists) may monitor the progression of a cancer and determine how cancer cells respond to therapies.

The SMR comprises an exquisitely sensitive scale that measures small changes in mass of a single cell. When cancer cells respond to cancer drugs, the cells begin the process of dying by changing mass within hours. The SMR detects this minor weight change. The speed and sensitivity allow the SMR to detect a cancer cell's response to a cancer drug while the cell is still living. Upon flowing the live cells through the SMR, a functional biomarker, such as mass or MAR, of the cells is obtained. MAR measurements characterize heterogeneity in cell growth across cancer cell lines. Individual live cells are able to pass through the SMR, wherein each cell is weighed multiple times over a defined interval. The SMR includes multiple sensors that are fluidically connected, such as in series, and separated by delay channels. Such a design enables a stream of cells to flow through the SMR such that different sensors can concurrently weigh flowing cells in the stream, revealing single-cell MARs. The SMR is configured to provide real-time, high-throughput monitoring of mass change for the cells flowing therethrough. Therefore, the biophysical properties, including mass and/or mass changes (e.g., MAR), of a single cell can be measured. Methods of calibration according the present invention include calibrating the multiple sensors of the SMR.

Another example of a functional biomarker instrument is a flow cytometer. A flow cytometer is used to detect and measure chemical characteristics of a population of cells or particles by suspending the cells in a fluid, injecting the cells in the instrument, and flowing one cell at a time through a laser. By calibrating a particular flow cytometer with a material having cell-like properties and then calibrating another flow cytometer with the same material, the measurements from each of the different flow cytometers may be compared. The measurements from the flow cytometers may be compared to analogous chemical characteristics measured using another instrument that has been calibrated using the same material.

In certain embodiments, the present invention is directed to a method of calibration. The method of calibration comprises introducing a material with cell-like properties and a known mass into a sensor on a measurement instrument to generate a calibration reading. An output module of the measurement instrument is adjusted until the measurement instrument calibrates to the known mass for the material. In an example, the calibration is absolute calibration, which uses a particle with cell-like properties and a known mass. In an example, the calibration is a relative calibration. In relative calibration, the particle with cell-like properties has an unchanging mass, but does not require a known mass.

In some embodiments, the cell-like properties of the material comprise a deformability or elasticity of the material. In some embodiments, the material comprises a hydrogel. A hydrogel is a polymer gel constructed of a network of crosslinked polymer chains. Hydrogels can be tailored to exhibit features of a living cell, such as deformability. This can be accomplished by selecting a desirable polymer with features that will allow a swollen state of the hydrogel that is similar to a state of the living cell. The hydrogels may be synthesized in any suitable way. Further, a polymer engineer can design and synthesize polymer networks with molecular-scale control over the hydrogel structure. For example, the cross-linking density and desired properties, such as biodegradation, mechanical strength, and chemical and biological response to stimuli, may be engineered in the hydrogel.

In some embodiments, the material comprises a cell or an altered cell. In some embodiments, the altered cell comprises a cell altered through chemical, biochemical, or mechanical means. In some embodiments, the material comprises one selected from the group consisting of a lipid mass, a polymer particle, a vesicle, and an emulsified particle. In some embodiments, a combination of materials with cell-like properties is used to define parameters to calibrate parts of the measurement system.

In certain embodiments, methods of the invention further comprise performing the running and adjusting step for each of a plurality of different instruments to thereby make mass readings across the different instruments comparable.

In some embodiments, a growth-reference standard is used for calibration instead of a mass-reference standard. In some embodiments, the growth-reference standard comprises a hydrogel that accumulates liquid media and swells at a known rate once introduced into the liquid media within a channel on the measurement instrument. In some embodiments, the growth-reference standard comprises a hydrogel that has an undetectable rate of mass change throughout measurement in the measurement instrument.

In some embodiments, the measurement device comprises a suspended microchannel resonator (SMR). In some embodiments, the measurement device comprises an SMR instrument comprising an array of SMRs with a fluidic channel passing therethrough. In some embodiments, the channel passes through the array of SMRs, in which each successive pair of SMRs is separated by a portion of the channel that provides a delay. In some embodiments, parts of the measurement system comprise sensors.

In certain embodiments, methods according to the invention further comprise introducing a same material to each of a plurality of different sensors of a same measurement instrument. Thereby, comparable mass readings are produced across different sensors of the same measurement instrument.

In an embodiment, the invention is directed to a method of relative calibration. The method comprises introducing a material with cell-like properties and an unchanging mass into a measurement instrument with multiple sensors to generate a calibration reading. An output module of the measurement instrument is adjusted until measurements of individual sensors of the measurement instrument for the material calibrate to a same measurement.

In some instances, a same material is successively transported to all sensors of the measurement instrument using microfluidic channels. In some embodiments, the measurement instrument comprises a suspended microchannel resonator (SMR). In some embodiments, the measurement device comprises an SMR instrument comprising an array of SMRs with a fluidic channel passing therethrough. In some embodiments, the channel passes through the array of SMRs, in which each successive pair of SMRs is separated by a portion of the channel that provides a delay. In some embodiments, parts of the measurement system comprise sensors.

In some embodiments, the cell-like properties of the material comprise a deformability or elasticity of the material. In some embodiments, a combination of materials with cell-like properties is used to define parameters to calibrate parts of the measurement instrument. In some embodiments, the material with cell-like properties is a hydrogel or combination of hydrogels. In some embodiments, the material comprises a cell or an altered cell. The altered cell may comprise a cell altered through chemical, biochemical, mechanical, or others means. In some embodiments, the material comprises one selected from the group consisting of a lipid mass, a polymer particle, a vesicle, and an emulsified particle.

In certain embodiments, methods of the invention further comprise performing the running and adjusting step for each of a plurality of different instruments to thereby make mass readings across the different instruments comparable.

In some embodiments, a growth-reference standard is used for calibration instead of a mass-reference standard. In some embodiments, the growth-reference standard comprises a hydrogel that accumulates liquid media and swells at a known rate once introduced into the liquid media within a channel on the measurement instrument. In some embodiments, the growth-reference standard comprises a hydrogel that has an undetectable rate of mass change throughout measurement in the measurement instrument.

In certain embodiments, methods of the invention further comprise introducing a same material to each of a plurality of different sensors of a same measurement instrument, thereby producing comparable mass readings across different sensors of the same measurement instrument.

DETAILED DESCRIPTION

Instruments used in methods of calibration of the invention are used to measure a functional biomarker in one or more live cells flowing therethrough. Methods of the invention are available for use with any functional biomarker measurement instrument. For example, single-cell biophysical properties include mass, growth rate, and mass accumulation. Such features are not discernable via genomic measurements and can only be obtained on live cells. Upon passing through the functional biomarker measurement instrument, the cells remain viable. The cells may be isolated downstream from the instrument and are available for subsequent use, such as testing in traditional assays (e.g., NGS testing).

An example of a functional biomarker measurement instrument is a suspended microchannel resonator (SMR) or serial SMR (sSMR). The SMR precisely measures biophysical properties, such as mass and mass changes, of a single cell flowing therethrough. In some instances, the mass change is mass accumulation rate (MAR). When used with cancer cells, the changes provide a functional, universal biomarker by which medical professionals (e.g., oncologists) may monitor the progression of a cancer and determine how cancer cells respond to therapies. The SMR comprises an exquisitely sensitive scale that measures small changes in mass of a single cell. When cancer cells respond to cancer drugs, the cells begin the process of dying by changing mass within hours. The SMR detects this minor weight change. The speed and sensitivity of the SMR allow detection a cancer cell's response to a cancer drug while the cell is still living.

Upon flowing the live cells through the SMR, a functional cancer biomarker in the live cells is obtained, the functional cancer biomarker including mass or mass accumulation rate (MAR). MAR measurements characterize heterogeneity in cell growth across cancer cell lines. Individual live cells are able to pass through the SMR, wherein each cell is weighed multiple times over a defined interval. The SMR includes multiple sensors that are fluidically connected, such as in series, and separated by delay channels. Such a design enables a stream of cells to flow through the SMR where different sensors concurrently weigh flowing cells in the stream and reveal single-cell MARs. The SMR provides real-time, high-throughput monitoring of mass change for the cells flowing therethrough. Therefore, the biophysical properties, including mass and/or mass changes (e.g., MAR), of a single cell can be measured. Such data may be stored and used in subsequent analysis steps, as will be described in greater detail herein. Various embodiments of SMR and sSMR instruments and methods of use include those manufactured by Innovative Micro Technology (Santa Barbara, Calif.) and described in U.S. Pat. Nos. 8,418,535 and 9,132,294, the contents of each of which are hereby incorporated by reference in their entirety.

Precision frequency detection allows the SMR to weigh single living cells, single nanoparticles, and adsorbed protein layers in fluid. Precision is the closeness of agreement between independent test results. When determining SMR resonance frequency optically, the use of an external laser and photodiode are required and cannot be easily arrayed for multiplexed measurements. In embodiments of the invention, electronic detection of SMR resonance frequency is attained by fabricating piezo-resistive sensors using ion implantation into single crystal silicon resonators. The mass resolution achieved with piezo-resistive detection, such as 3.4 femtogram (fg) in a 1 kHz bandwidth, is comparable to what can be achieved by a conventional optical detector designed to weigh micron-sized particles and cells. This eliminates the need for expensive, delicate optical components and provides new uses for the SMR in multiplexed and field deployable applications. For example, piezo-resistive sensors eliminate the need for external components by measuring deflection through the resistance change of a sensing element integrated onto the cantilever. Microfluidic channels are incorporated inside a cantilever resonator, which significantly reduces viscous damping from fluid and allows buoyant mass to be measured with high resolution.

The SMR is subject to calibration in order to maintain the capability of measuring single nanoparticles, single cells, and layers of adsorbed proteins at an extremely sensitive level, such as necessary to measure mass change in a single living cell.

Figure 1:
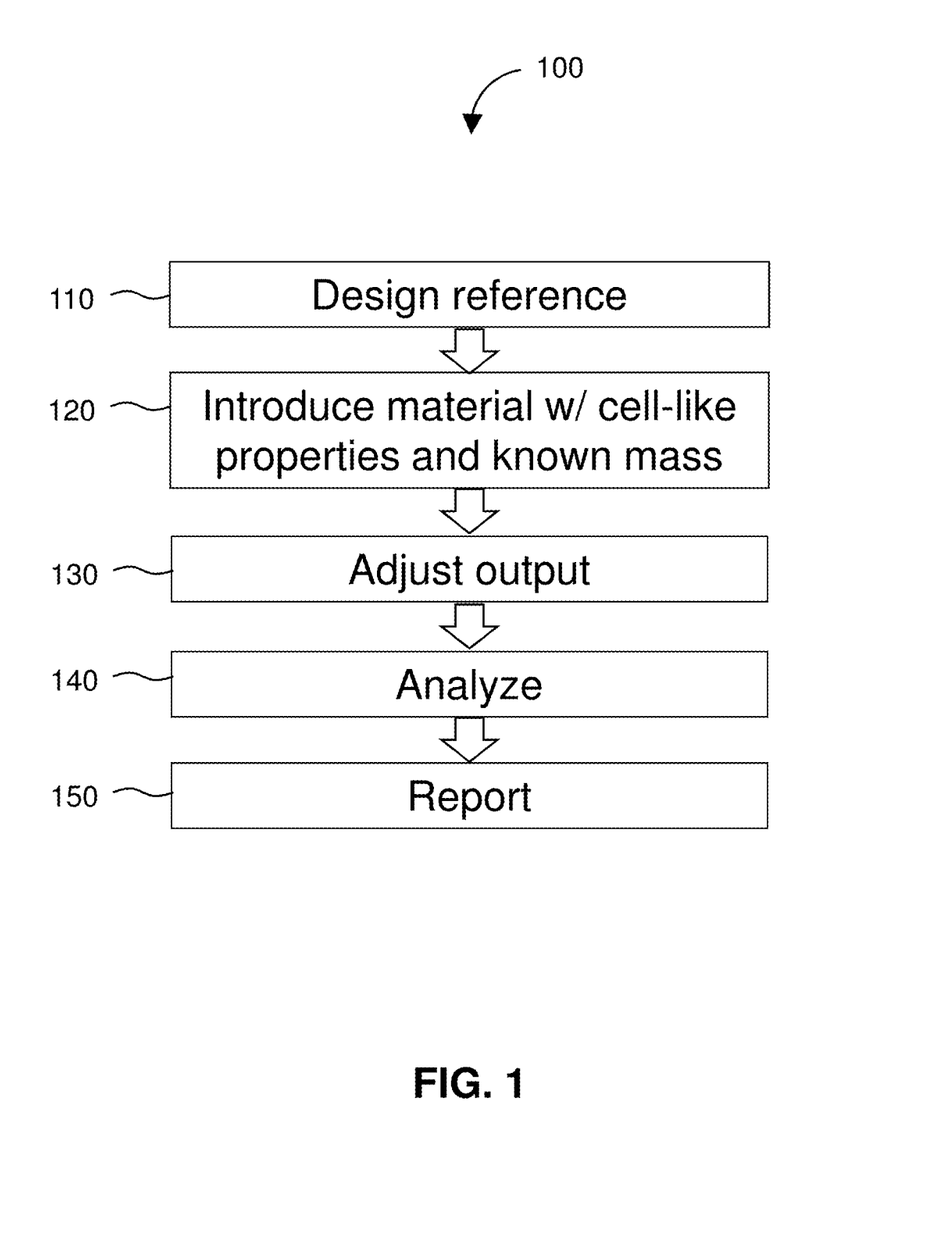
FIG. 1 diagrams a method of instrument calibration.

FIG. 1 diagrams a method of calibration 100. The method 100 includes introducing 120 a reference material into an instrument that is used to measure a functional property of living cells. The reference material has cell-like properties, such an elasticity or deformability designed 110 to be similar to those properties as found in cells. In some embodiments, the reference material has a known mass. Other embodiments provide for relative calibration between instruments and do require that the mass of the reference material be known, only that the mass remain constant between calibration runs. The reference material with cell-like properties and known mass is introduced 120 into the measurement instrument, and the measurement instrument is operated to make a mass reading of the reference material An output, or readout, of the instrument is adjusted 130 until the reading is calibrated to the known mass for the reference material. The calibration method 100 may further comprise analyzing 140 the results of the adjustment step and producing 150 a report.

The method 100 further includes analyzing data 140 from the adjustment step for calibration of the instrument. In an example, the analysis specifies how many adjustments were needed for particular sensors or areas in the instrument. The analyzing step 140 may include documenting the calibration operation.

Preferably, the method 100 includes providing 150 a report that includes information related to the calibration. In an example, specific data associated with the material having cell-like properties and data for each sensor or area in the instrument requiring calibration is reported. The report may be a certification of that instruments calibration and may include information such as date, time, serial number, or technician ID.

In some embodiments, the method 100 includes designing 110 the reference material to include features of the testing material. For example, if the testing material is a living cell, the reference material may be designed or selected to have cell-like properties such as elasticity, deformability, or density. In some embodiments, the reference material comprises a hydrogel. A hydrogel is a polymer gel constructed of a network of crosslinked polymer chains. Hydrogels may be two- or multi-component systems consisting of a three-dimensional network of polymer chains. Varying amounts of water fill the space between macromolecules. The amount of water depends on the properties of the polymers used and the nature and density of the network joints. In the swollen state, the mass fraction of water in a hydrogel is much higher than the mass fraction of polymer. To achieve high degrees of swelling, synthetic polymers that are water-soluble when in non-cross-linked form may be used.

Hydrogels can be designed 110 to exhibit properties found in a living cell, such as deformability. This is accomplished by selecting a desirable polymer with features that allow a swollen state of the hydrogel similar to a state of the living cell. The hydrogels may be synthesized in any suitable way. For example, hydrogels may be synthesized by methods described in the Journal of Advanced Research (2015) 6, 105-121, the contents of which are incorporated herein in their entirety. For example, classical chemical methods may be used. Examples of classic chemical methods include one-step procedures like polymerization and parallel cross-linking of multifunctional monomers, multiple step procedures involving synthesis of polymer molecules having reactive groups and their subsequent cross-linking, and by reacting polymers with suitable cross-linking agents. Further, a polymer engineer can design and synthesize polymer networks with molecular-scale control over structure such as cross-linking density and with tailored properties, such as biodegradation, mechanical strength, and chemical and biological response to stimuli.

In some embodiments, the measurement device comprises a suspended microchannel resonator (SMR). In some embodiments, the measurement device comprises an SMR instrument comprising an array of SMRs with a fluidic channel passing therethrough. For example, the measurement device may comprise a serial SMR. In some embodiments, the channel passes through the array of SMRs, in which each successive pair of SMRs is separated by a portion of the channel that provides a delay. In some embodiments, parts of the measurement system comprise sensors.

Another example of a functional biomarker instrument is a flow cytometer. A flow cytometer is used to detect and measure chemical characteristics of a population of cells or particles by suspending the cells in a fluid, injecting the cells in the instrument, and flowing one cell at a time through a laser. By calibrating a particular flow cytometer with a material having cell-like properties and then calibrating another flow cytometer with the same material, the measurements from each of the different flow cytometers may be compared. The measurements from the flow cytometers may be compared to analogous chemical characteristics measured using another instrument that has been calibrated using the same material.

In an example, the calibration is absolute calibration, which uses a particle with cell-like properties and a known mass. In some examples, the calibration is a relative calibration. In relative calibration, the particle with cell-like properties has an unchanging mass, but does not require a known mass.

Figure 2:
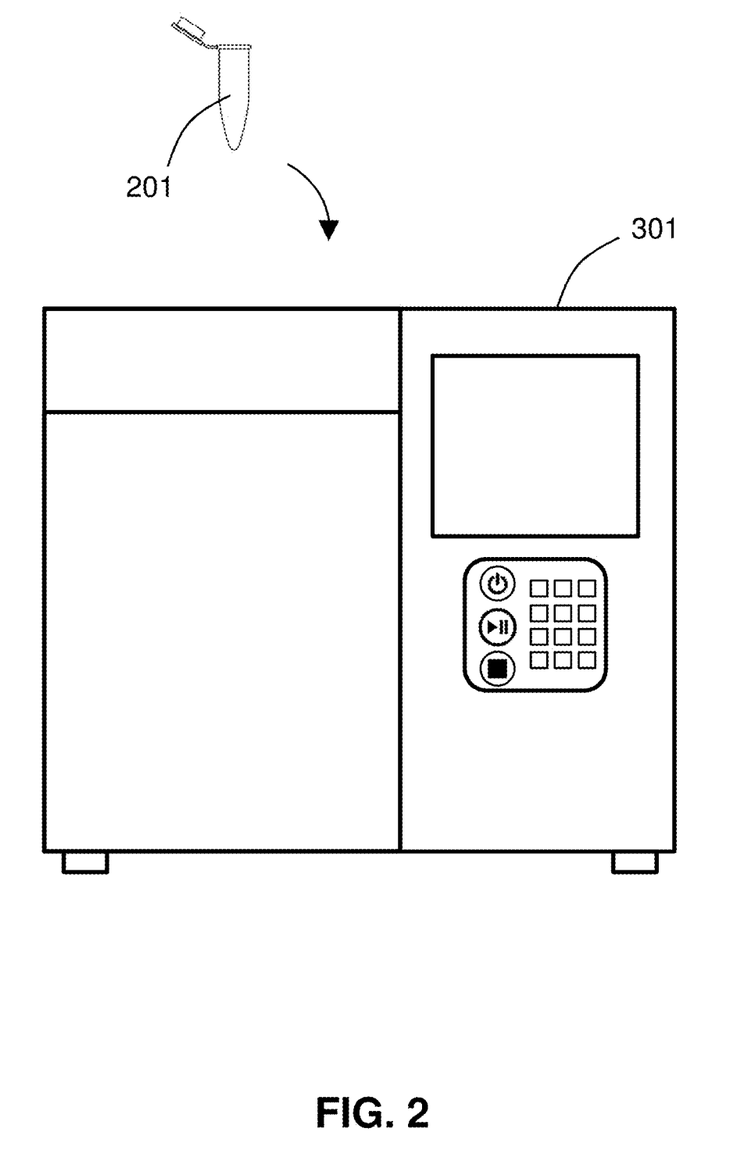
FIG. 2 shows an instrument for making functional measurements of live cells.

FIG. 2 shows a measurement instrument 301 that makes functional measurements of live cells that may be calibrated using methods according to the invention. In normal operation, a sample 201 is obtained (e.g., by blood draw or fine needle aspirate of a solid tumor) and delivered to the instrument 301 from a suitable container such as a microcentrifuge tube sold under the trademark EPPENDORF by Eppendorf, Inc. The sample 201 is introduced onto the measurement instrument 301, which makes a functional measurement of individual living cells in the sample 201. In certain embodiments, the instrument uses a suspended microchannel resonator (SMR) or serial SMR (sSMR). The SMR precisely measures biophysical properties, such as mass and mass changes, of a single cell flowing therethrough. The mass change may be mass accumulation rate (MAR). When used with cancer cells, the changes provide a functional, universal biomarker by which medical professionals (e.g., oncologists) may monitor the progression of a cancer and determine how cancer cells respond to therapies. In some examples, the SMR comprises an exquisitely sensitive scale that measures small changes in mass of a single cell. When cancer cells respond to cancer drugs, the cells begin the process of dying by changing mass within hours. The SMR detects this minor weight change. That speed and sensitivity allow the SMR to detect a cancer cell's response to a cancer drug while the cell is still living. Methods and materials of the disclosure may be used to calibrate the SMR or a similar measurement instrument 301.

Figure 3:
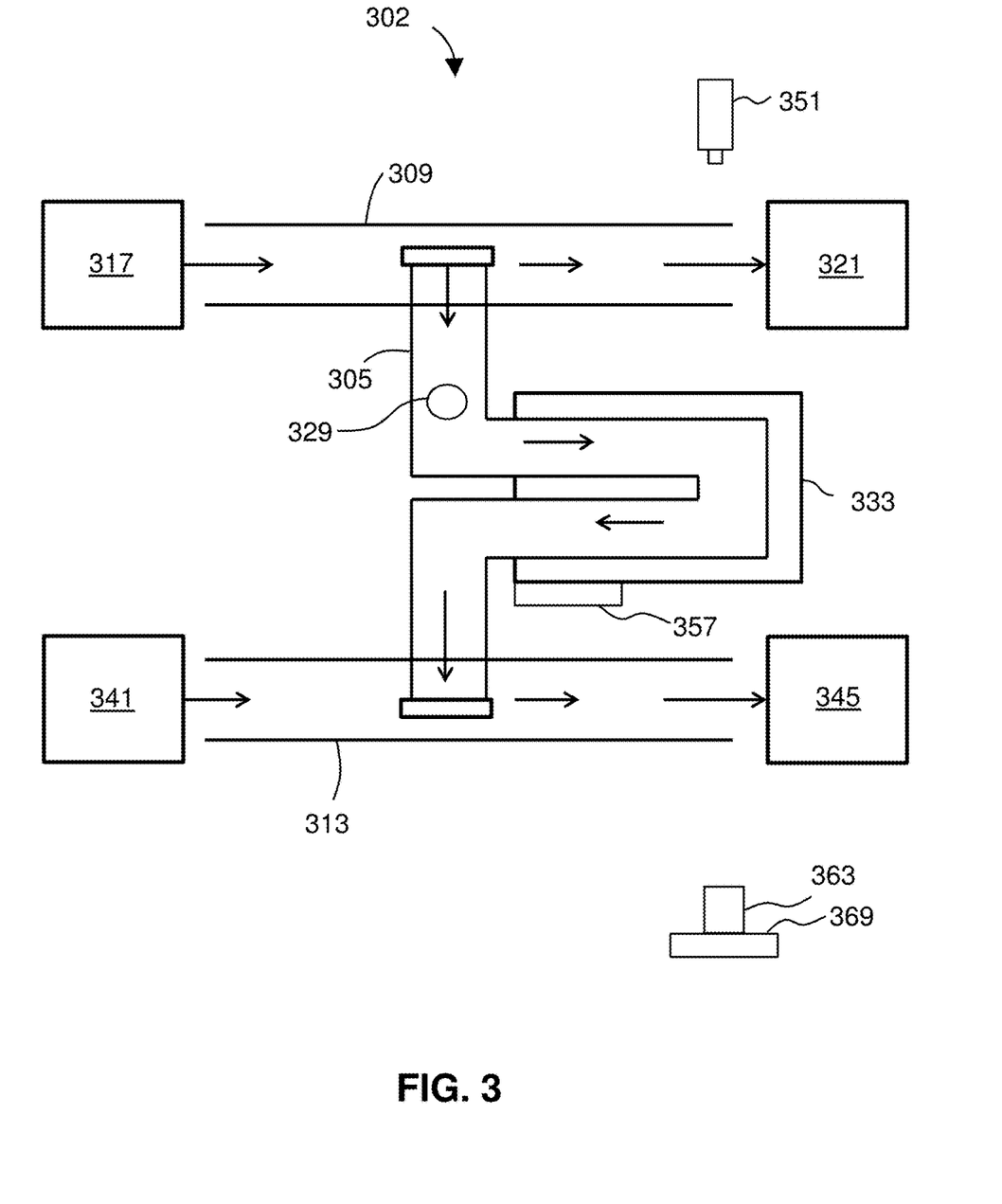
FIG. 3 shows a suspended microchannel resonator (SMR) device.

FIG. 3 shows a suspended microchannel resonator (SMR) device 302 of the invention. The SMR device 302 includes a microchannel 305 that runs through a cantilever 333, which is suspended between an upper bypass channel 309 and a lower bypass channel 313. Having the two bypass channels allows for decreased flow resistance and accommodates the flow rate through the microchannel 305. Sample eluate 317 flows through the upper bypass channel 309, wherein a portion of the eluate 317 collects in the upper bypass channel waste reservoir 321. The calibration method is depicted. A reference material 329 with cell-like properties (and optionally a known mass) has been introduced 120 into the channel 305.

A portion of the eluate 317 including the reference material 329 flows through the suspended microchannel 305. The flow rate through the suspended microchannel 305 is determined by the pressure difference between the inlet and outlet. Since the flow cross section of the suspended microchannel is about 70 times smaller than that of the bypass channels, the linear flow rate can be much faster in the suspended microchannel than in the bypass channel, even though the pressure difference across the suspended microchannel is small. Therefore, at any given time, it is assumed that the SMR is measuring the eluate that is present at the inlet of the suspended microchannel. The sample includes a live cell or material with cell-like properties.

The reference material 329 flows through the suspended microchannel 305. The suspended microchannel 305 extends through a cantilever 333 which sits between a light source 351 and a photodetector 363 connected to a chip 369 such as a field programmable gate array (FPGA). The cantilever is operated on by an actuator, or resonator 357. The resonator 357 may be a piezo-ceramic actuator seated underneath the cantilever 333 for actuation. The cell 329 flows from the upper bypass channel 309 to the inlet of the suspended microchannel 305, through the suspended microchannel 305, and to the outlet of the suspended microchannel 305 toward the lower bypass channel 313. A buffer 341 flows through the lower bypass channel towards a lower bypass channel collection reservoir 345. After the reference material 329 is introduced to the lower bypass channel 313, the reference material 329 is collected in the lower bypass collection reservoir 345.

By flowing the reference material 329 through the SMR device 302, a reading or measurement may be made, and the readout of the measurement may be adjusted until it converges on the known mass of the reference material 329 to thereby calibrate the instrument 301. Once the instrument is calibrated, it may be used for making measurements of functional properties of live cells such as measurements of mass or mass accumulation rate (MAR). MAR measurements characterize heterogeneity in cell growth across cancer cell lines. Individual live cells are able to pass through the SMR, wherein each cell is weighed multiple times over a defined interval. The SMR includes multiple sensors that are fluidically connected, such as in series, and separated by delay channels. Such a design enables a stream of cells to flow through the SMR such that different sensors can concurrently weigh flowing cells in the stream, revealing single-cell MARs. The SMR device 302 provides real-time, high-throughput monitoring of mass change for the cells flowing therethrough. Therefore, the biophysical properties, including mass and/or mass changes (e.g., MAR), of a single cell can be measured. Such data can be stored and used in subsequent analysis steps, as will be described in greater detail herein. Various embodiments of SMR and sSMR instruments and methods of use include those manufactured by Innovative Micro Technology (Santa Barbara, Calif.) and described in U.S. Pat. Nos. 8,418,535 and 9,132,294, the contents of each of which are hereby incorporated by reference in their entirety.

Upon passing through the instrument 301, single cells remain viable. The cells can be isolated downstream from the instrument 301 and are available to undergo the subsequent assays. As shown, a sample 209 having undergone the first assay (i.e., passing through the instrument 301) is collected in a suitable container 213 and then available to undergo a second assay.

In some embodiments, the instrument 301 comprises an array of SMRs with a fluidic channel passing therethrough.

Figure 4:
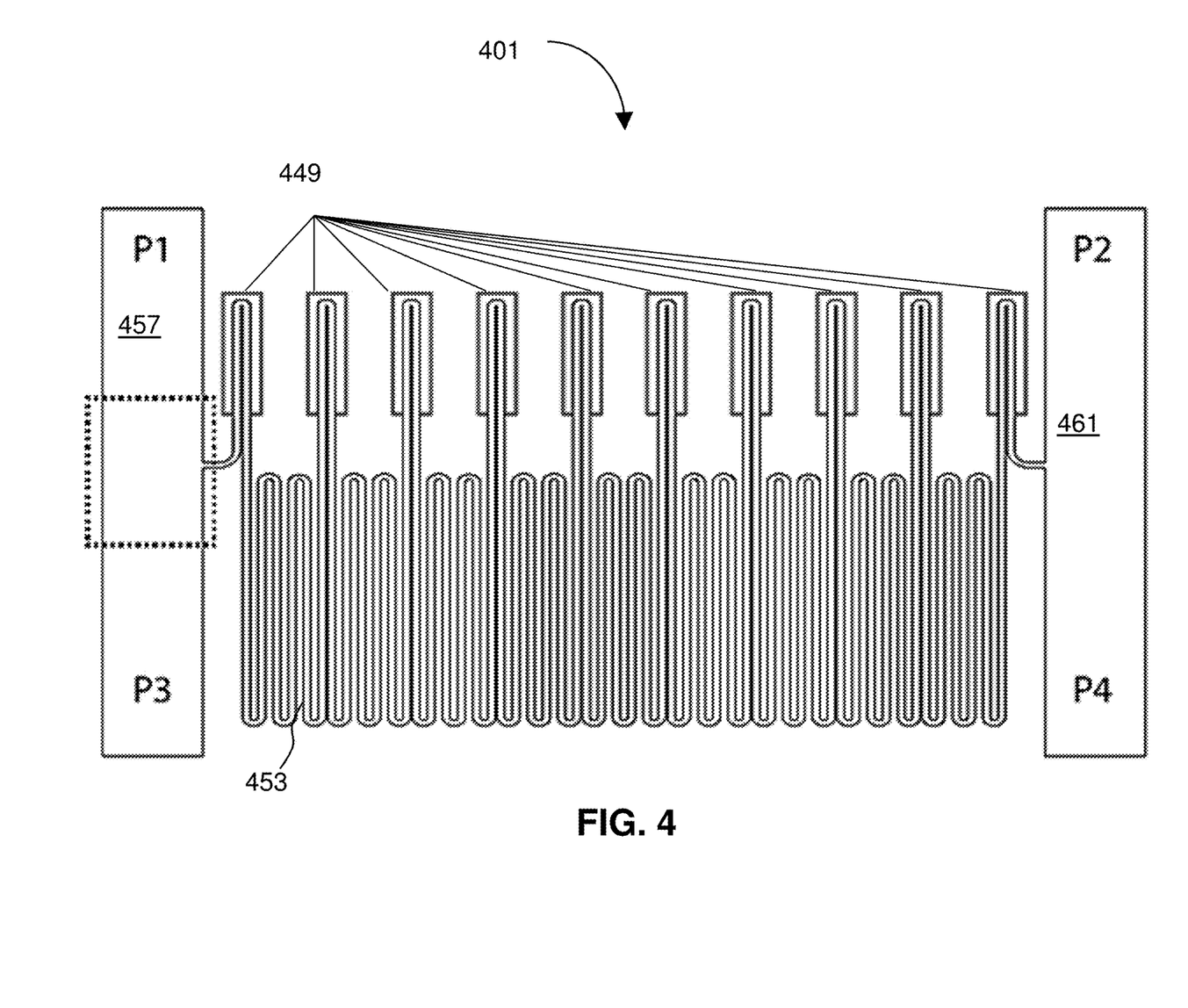
FIG. 4 shows a serial suspended microchannel resonator (sSMR) array.

FIG. 4 shows a serial suspended microchannel resonator (sSMR) array 401, made up of an array of SMRs. An instrument that includes an sSMR array is useful for direct measurement of biophysical properties of single cells flowing therethrough. The sSMR includes a plurality of cantilevers 449 and a plurality of delay channels 453. Cells from the first bypass channel 457 flow through the cantilevers 449 and delay channels 453 to the second bypass channel 461. Pressure differences in the first bypass channel 457 are indicated by P1 and P2, and pressure differences in the second bypass channel 461 are indicated by P3 and P4. The sSMR array 401 may be calibrated using the reference material 329 with cell-like properties.

Once calibrated, instruments 301 of the disclosure can make reliably sensitive and precise measurements of mass or change in mass through the use of an sSMR array 401. The instruments use a structure such as a cantilever that contains a fluidic microchannel. Living cells are flowed through the structure, which is resonated and the frequency of resonation is measured. The frequency at which a structure resonates is dependent on its mass. By measuring the frequency of at which the cantilever resonates, the instrument computes a mass, or change in mass, of a living cell in the fluidic microchannel. By flowing the isolated living cells from the tissue sample through such devices, the functions of those cells is observable, such as whether or not the cells are growing and accumulating mass. The mass accumulation or rate of mass accumulation can be a clinically important property that is used to indicate the presence of cancer cells or the efficacy of a therapeutic on cancer cells.

Methods for measuring single-cell growth are based on resonating micromechanical structures. The methods exploit the fact that a micromechanical resonator's natural frequency depends on its mass. Adding cells to a resonator alters the resonator's mass and causes a measurable change in resonant frequency. Suspended microchannel resonators (SMRs) include a sealed microfluidic channel that runs through the interior of a cantilever resonator. The cantilever itself may be housed in an on-chip vacuum cavity, reducing damping and improving frequency (and thus mass) resolution. As a cell in suspension flows through the interior of the cantilever, it transiently changes the resonant frequency of the cantilever in proportion to the buoyant mass of the cell. SMRs weigh single mammalian cells with a resolution of 0.05 pg (0.1% of a cell's buoyant mass) or better. The sSMR array 401 includes an array of SMRs fluidically connected in series and separated by delay channels between each cantilever 349. The delay channels give the cell time to grow as it flows between cantilevers.

Devices may be fabricated as described in Lee, 2011, Suspended microchannel resonators, Lab Chip 11:645 and/or Burg, 2007, Weighing of biomolecules, Nature 446:1066-1069, both incorporated by reference. Large-channel devices (e.g., useful for PBMC measurements) may have cantilever interior channels of 15 by 20 μm in cross-section, and delay channels 20 by 30 μm in cross-section. Small-channel devices (useful for a wide variety of cell types) may have cantilever channels 3 by 5 μm in cross-section, and delay channels 4 by 15 μm in cross-section. The tips of the cantilevers 449 in the sSMR array 401 may be aligned so that a single line-shaped laser beam can be used for optical-lever readout. The cantilevers may be arrayed such that the shortest (and therefore most sensitive) cantilevers are at the ends of the array. Before use, the sSMR array 401 may be cleaned with piranha (3:1 sulfuric acid to 50% hydrogen peroxide) and the channel walls may be passivated with polyethylene glycol (PEG) grafted onto poly-L-lysine. In some embodiments, a piezo-ceramic actuator seated underneath the device is used for actuation. The instrument 301 may include low-noise photodetector, Wheatstone bridge-based amplifier (for piezo-resistor readout), and high-current piezo-ceramic driver. To avoid the effects of optical interference between signals from different cantilevers (producing harmonics at the difference frequency), the instrument may include a low-coherence-length light source (675 nm super-luminescent diode, 7 nm full-width half maximum spectral width) as an optical lever. After the custom photodetector converts the optical signal to a voltage signal, that signal is fed into an FPGA board, in which an FPGA implements twelve parallel second-order phase-locked loops which each both demodulate and drive a single cantilever. The FPGA may be a Cyclone IV FPGA on a DE2-115 development board operating on a 100 MHz clock with I/O provided via a high-speed AD/DA card operating 14-bit analog-to-digital and digital-to-analog converters at 100 MHz.

To operate all cantilevers 449 in the sSMR array 401, the resonator array transfer function is first measured by sweeping the driving frequency and recording the amplitude and phase of the array response. Parameters for each phase-locked loop (PLL) are calculated such that each cantilever-PLL feedback loop has a 50 or 100 Hz FM-signal bandwidth. The phase-delay for each PLL may be adjusted to maximize the cantilever vibration amplitude. The FM-signal transfer function may be measured for each cantilever-PLL feedback loop to confirm sufficient measurement bandwidth (in case of errors in setting the parameters). That transfer function relates the measured cantilever-PLL oscillation frequency to a cantilever's time-dependent intrinsic resonant frequency. Frequency data for each cantilever may be collected at 500 Hz, and may be transmitted from the FPGA to a computer. The device may be placed on a copper heat sink/source connected to a heated water bath, maintained at 37° C. The sample is loaded into the device from vials pressurized under air or air with 5% $CO_2$ through 0.009 inch inner-diameter fluorinated ethylene propylene (FEP) tubing. The pressurized vials may be seated in a temperature-controlled sample-holder throughout the measurement. FEP tubing allows the device to be flushed with piranha solution for cleaning, as piranha will damage most non-fluorinated plastics. To measure a sample of cells, the sSMR array 401 may initially flushed with filtered media, and then the sample may be flushed into one bypass channel. On large-channel devices, between one and two psi may be applied across the entire array, yielding flow rates on the order of 0.5 nL/s (the array's calculated fluidic resistance is approximately 3×10^16 Pa/(m$^3$/s). For small-channel devices, 4-5 psi may be applied across the array, yielding flow rates around 0.1 nL/s. Additionally, every several minutes new sample may be flushed into the input bypass channel to prevent particles and cells from settling in the tubing and device. Between experiments, devices may be cleaned with filtered 10% bleach or piranha solution.

For the data analysis, the recorded frequency signals from each cantilever 449 are rescaled by applying a rough correction for the different sensitivities of the cantilevers. Cantilevers differing only in length have mass sensitivities proportional to their resonant frequencies to the power three-halves. Therefore, each frequency signal is divided by its carrier frequency to the power three-halves such that the signals are of similar magnitude. To detect peaks, the data are filtered with a low pass filter, followed by a nonlinear high pass filter (subtracting the results of a moving quantile filter from the data). Peak locations are found as local minima that occur below a user-defined threshold. After finding the peak locations, the peak heights may be estimated by fitting the surrounding baseline signal (to account for a possible slope in the baseline that was not rejected by the high pass filter), fitting the region surrounding the local minima with a fourth-order polynomial, and finding the maximum difference between the predicted baseline and the local minima polynomial fit. Identifying the peaks corresponding to calibration particles allows one to estimate the mass sensitivity for each cantilever, such that the modal mass for the particles is equal to the expected modal mass. Peaks at different cantilevers 449 that originate from the same cell are matched up to extract single-cell growth information. The sSMR array 401 and can measure live cells.

Figure 5:
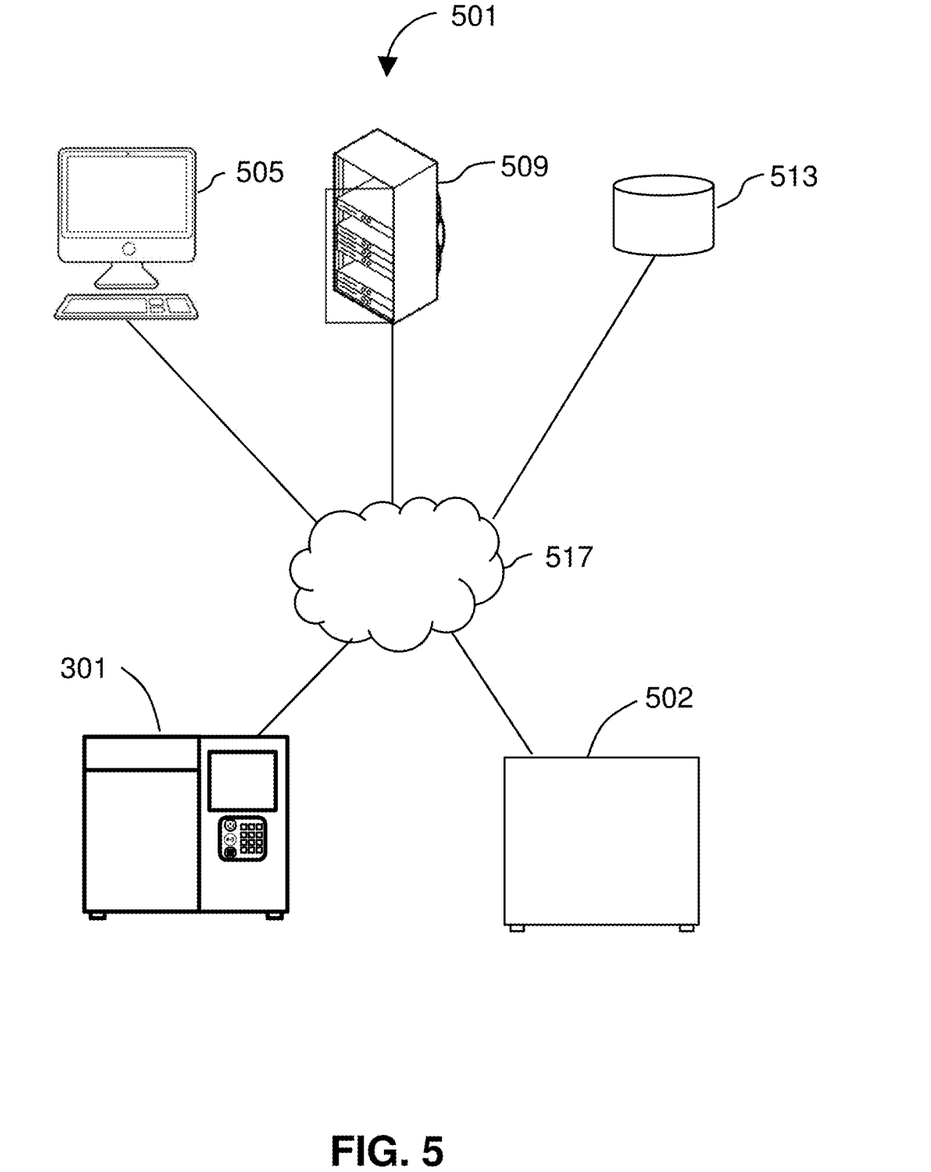
FIG. 5 diagrams a system of the disclosure.

FIG. 5 diagrams a system 501 according to certain embodiments of the invention. The system 501 includes an instrument 301 communicatively coupled to a computer 505. The system 501 optionally includes a server 509, storage 513, and one or any number of additional assay instruments 502 (e.g., next-generation sequencing instruments).

Any of the instrument 301, the computer 505, the server 509, the storage 513, and the additional assay instrument 502 that are included preferably exchange data via communication network 517. Where methods of the invention employ a client/server architecture, steps of methods of the invention may be performed using the server, which includes one or more of processors and memory, capable of obtaining data, instructions, etc., or providing results via an interface module or providing results as a file. The server may be provided by a single or multiple computer devices, such as the rack-mounted computers sold under the trademark BLADE by Hitachi. In system 501, each computer preferably includes at least one processor coupled to a memory and at least one input/output (I/O) mechanism.

A processor generally includes a chip, such as a single core or multi-core chip, to provide a central processing unit (CPU). A processor may be provided by a chip from Intel or AMD.

Memory can include one or more machine-readable devices on which is stored one or more sets of instructions (e.g., software) which, when executed by the processor(s) of any one of the disclosed computers can accomplish some or all of the methodologies or functions described herein. A computer of the invention will generally include one or more I/O device such as, for example, one or more of a video display unit (e.g., a liquid crystal display (LCD) or a cathode ray tube (CRT)), an alphanumeric input device (e.g., a keyboard), a cursor control device (e.g., a mouse), a disk drive unit, a signal generation device (e.g., a speaker), a touchscreen, an accelerometer, a microphone, a cellular radio frequency antenna, and a network interface device, which can be, for example, a network interface card (NIC), Wi-Fi card, or cellular modem. The system 501 may be used to perform methods described herein. Instructions for any method step may be stored in memory and a processor may execute those instructions.

Figure 6:
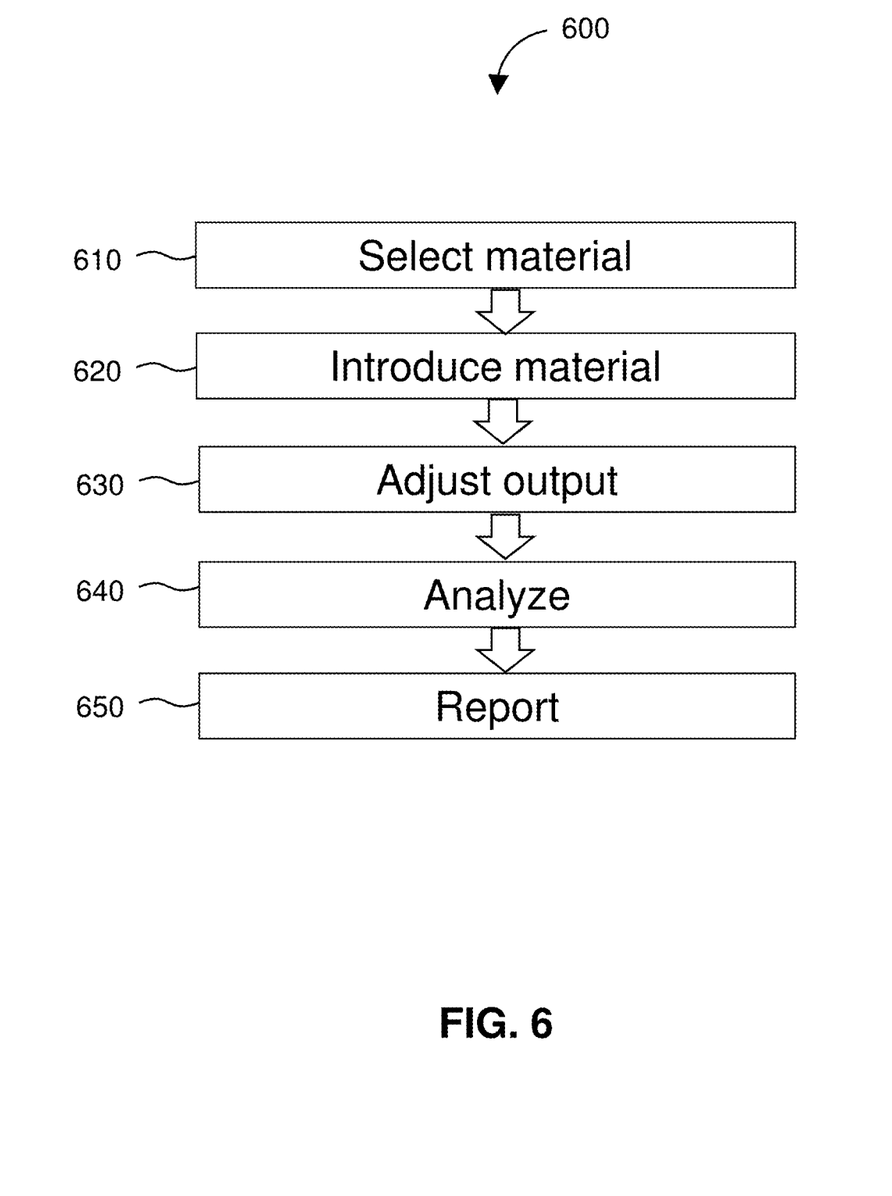
FIG. 6 shows a method of relative calibration.

FIG. 6 shows a method of relative calibration 600. In relative calibration, though the mass of the material used for calibration may not be known, the mass does not change throughout the calibration process across multiple devices. The method 600 comprises introducing 620 a reference material with cell-like properties and an unchanging mass into a measurement instrument with multiple sensors, or to multiple instruments. Each sensor or instrument is operated to make a reading of mass from the reference material. The method 600 includes adjusting 630 an output module of the measurement instrument until measurements of individual sensors or instruments converge on each other.

The calibration method 600 may further comprise analyzing 640 the results of the adjustment step and producing 650 a report. For example, the analysis may specify how many adjustments were needed for particular sensors or areas in the instrument. The report may comprise information related to the calibration, including, but not limited to, specific data associated with the material having cell-like properties and data for each sensor or area in the instrument requiring calibration.

The method 600 may also include designing/selecting 610 the reference material to include relevant features of the testing material. For example, if the testing material is a living cell, features of the testing material may be cell-like properties. In some embodiments, the cell-like properties of the material comprise a deformability or elasticity of the material.

In some instances, a same material is successively transported to all sensors of the measurement instrument using microfluidic channels. In some embodiments, the measurement instrument comprises a suspended microchannel resonator (SMR). In some embodiments, the measurement device comprises an SMR instrument comprising an array of SMRs with a fluidic channel passing therethrough. For example, the SMR instrument may be a serial SMR. In some embodiments, the channel passes through the array of SMRs, in which each successive pair of SMRs is separated by a portion of the channel that provides a delay. In some embodiments, parts of the measurement system comprise sensors. For example, the SMR may comprise sensors at each cantilever within the SMR.

In some embodiments, the cell-like properties of the material comprise a deformability or elasticity of the material. In some embodiments, a combination of materials with cell-like properties is used to define parameters to calibrate parts of the measurement instrument. In some embodiments, the material with cell-like properties is a hydrogel or combination of hydrogels. In some embodiments, the material comprises a cell or an altered cell. The altered cell may comprise a cell altered through chemical, biochemical, mechanical, or others means. In some embodiments, the material comprises one selected from the group consisting of a lipid mass, a polymer particle, a vesicle, and an emulsified particle.

In some embodiments, a combination of materials with cell-like properties is used to define parameters to calibrate parts of the measurement system. For example, multiple types of hydrogels may be used in combination, a hydrogel may be used in combination with a cell, a hydrogel may be used in combination with an altered cell, multiple types of altered cells may be used in combination, multiple types of cells may be used in combination, and a cell and an altered cell may be used in combination.

In certain embodiments, methods of the invention further comprise performing the running and adjusting step for each of a plurality of different instruments to thereby make mass readings across the different instruments comparable. For example, a hydrogel may be tailored to mimic a specified living cell, such as a cancer cell. The cancer cell may be the desired target for testing using multiple SMR instruments. The tailored hydrogel may be used for calibration in each of the SMR instruments. This allows each of the SMR instruments to be calibrated uniformly so that mass or MAR readings from the different SMR instruments is comparable.

In some embodiments, a growth-reference standard is used for calibration instead of a mass-reference standard. For example, as mentioned above, hydrogels may be synthesized based on water retention and swelling, and thereby may be used as a growth-reference standard for calibration. In some embodiments, the growth-reference standard comprises a hydrogel that accumulates liquid media and swells at a known rate once introduced into the liquid media within a channel on the measurement instrument. In some embodiments, the growth-reference standard comprises a hydrogel that has an undetectable rate of mass change throughout measurement in the measurement instrument.

In certain embodiments, methods of the invention further comprise introducing a same material to each of a plurality of different sensors of a same measurement instrument, thereby producing comparable mass readings across different sensors of the same measurement instrument. For example, a hydrogel material may be introduced to each of the plurality of sensors in a particular SMR instrument, resulting in comparable mass readings across the different sensors within that SMR instrument.

INCORPORATION BY REFERENCE

References and citations to other documents, such as patents, patent applications, patent publications, journals, books, papers, web contents, have been made throughout this disclosure. All such documents are hereby incorporated herein by reference in their entirety for all purposes.

EQUIVALENTS

While the present invention has been described in conjunction with certain embodiments, one of ordinary skill, after reading the foregoing specification, will be able to effect various changes, substitutions of equivalents, and other alterations to the compositions and methods set forth herein.

What is claimed is:

1. A method of calibration comprising:
   introducing a material with cell-like properties and a known mass into a sensor on a measurement instrument to generate a calibration reading; and
   adjusting an output module of the measurement instrument until the measurement instrument calibrates to the known mass for the material.

2. The method of claim 1, wherein the cell-like properties of the material comprise a deformability or elasticity of the material.

3. The method of claim 1, wherein the material comprises a hydrogel.

4. The method of claim 1, wherein the material comprises a cell or an altered cell.

5. The method of claim 4, wherein the altered cell comprises a cell altered through chemical, biochemical, or mechanical means.

6. The method of claim 1, wherein the material comprises one selected from the group consisting of a lipid mass, a polymer particle, a vesicle, and an emulsified particle.

7. The method of claim 1, further comprising performing the running and adjusting step for each of a plurality of different instruments to thereby make mass readings across the different instruments comparable.

8. The method of claim 1, wherein a growth-reference standard is used for calibration instead of a mass-reference standard.

9. The method of claim 8, wherein the growth-reference standard comprises a hydrogel that accumulates liquid media and swells at a known rate once introduced into the liquid media within a channel on the measurement instrument.

10. The method of claim 8, wherein the growth-reference standard comprises a hydrogel that has an undetectable rate of mass change throughout a duration of measurement in the measurement instrument.

11. The method of claim 1, wherein the measurement device comprises a suspended microchannel resonator (SMR).

12. The method of claim 1, wherein the measurement device comprises an SMR instrument comprising an array of SMRs with a fluidic channel passing therethrough.

13. The method of claim 12, wherein the channel passes through the array of SMRs, in which each successive pair of SMRs is separated by a portion of the channel that provides a delay.

14. The method of claim 1, wherein a combination of materials with cell-like properties is used to define parameters to calibrate parts of the measurement system.

15. The method of claim 14, wherein parts of the measurement system comprise sensors.

16. The method of claim 1, further comprising introducing a same material to each of a plurality of different sensors of a same measurement instrument, thereby producing comparable mass readings across different sensors of the same measurement instrument.

17. A method of relative calibration comprising:
introducing a material with cell-like properties and an unchanging mass into a measurement instrument with multiple sensors to generate a calibration reading; and
adjusting an output module of the measurement instrument until measurements of individual sensors of the measurement instrument for the material calibrates to a same measurement.

18. The method of claim 17, wherein a same material is successively transported to all sensors of the measurement instrument using microfluidic channels.

19. The method of claim 17, wherein a combination of materials with cell-like properties is used to define parameters to calibrate parts of the measurement instrument.

20. The method of claim 17, wherein the material with cell-like properties is a hydrogel or combination of hydrogels.

21. The method of claim 17, wherein the measurement instrument comprises a suspended microchannel resonator (SMR).

22. The method of claim 17, wherein the cell-like properties of the material comprise a deformability or elasticity of the material.

23. The method of claim 17, wherein the material comprises a cell or an altered cell.

24. The method of claim 23, wherein the altered cell comprises a cell altered through chemical, biochemical, or mechanical means.

25. The method of claim 17, wherein the material comprises one selected from the group consisting of a lipid mass, a polymer particle, a vesicle, and an emulsified particle.

26. The method of claim 17, further comprising performing the running and adjusting step for each of a plurality of different instruments to thereby make mass readings across the different instruments comparable.

27. The method of claim 17, wherein a growth-reference standard is used for calibration instead of a mass-reference standard.

28. The method of claim 27, wherein the growth-reference standard comprises a hydrogel that accumulates liquid media and swells at a known rate once introduced into the liquid media within a channel on the measurement instrument.

29. The method of claim 27, wherein the growth-reference standard comprises a hydrogel that has an undetectable rate of mass change throughout a duration of measurement in the measurement instrument.

30. The method of claim 17, wherein the measurement device comprises an SMR instrument comprising an array of SMRs with a fluidic channel passing therethrough.

31. The method of claim 30, wherein the channel passes through the array of SMRs, in which each successive pair of SMRs is separated by a portion of the channel that provides a delay.

32. The method of claim 31, wherein parts of the measurement system comprise sensors.

33. The method of claim 17, further comprising introducing a same material to each of a plurality of different sensors of a same measurement instrument, thereby producing comparable mass readings across different sensors of the same measurement instrument.

* * * * *